Patented Dec. 26, 1939

2,185,121

UNITED STATES PATENT OFFICE 2,185,121

HEAT HARDENING COATING COMPOSITION

Roy E. Coleman, Meriden, Conn., assignor to The Zein Corporation of America, a corporation of Delaware No Drawing. Application November 30, 1937, Serial No. 177,302

11 Claims. (Cl. 260—6)

This invention relates to liquid coating compositions of the heat-hardening type and more particularly to substantially non-aqueous heat-hardening or thermo-setting liquid coating compositions comprising zein or other prolamin and a non-aqueous soluble urea-aldehyde resin.

In the following description of my invention I will refer to the preparation of heat-hardening liquid coating compositions containing zein derived from corn, but it is to be understood that my invention is also applicable to heat-hardening liquid coating compositions containing other prolamins such as, for example, gliadin from wheat, hordein from barley, kafirin from kafir and the prolamins from other cereal grains. The above-mentioned prolamins are at present derived by extraction with an aqueous alcohol solution in which the added water varies generally from about 15 to about 40% of the solvent mixture. The zein used in accordance with my invention is the dried extract which may be completely dry or the commercial product which contains a small percentage of moisture.

The heat-hardening component used in the coating composition embodying my invention may suitably be any one of the heat-hardening urea-aldehyde resins soluble in non-aqueous solvents and adapted for use in lacquer and like coatings such as, for example, the heat-hardening urea-aldehyde resins produced in accordance with Patent No. 1,633,337, granted to Lauter on June 21, 1927. One of the resins made in accordance with the teachings of this patent and which has been successfully used in accordance with my invention is sold in the trade as "Uformite F-224."

In accordance with my present invention, I have found that heat-hardening liquid coating compositions comprising a solution of zein and a urea-aldehyde resin soluble in non-aqueous solvents are capable of forming extremely tough, strong and non-brittle films after baking and can be formed, for example, by combining a solution of zein with a solution of a partially reacted urea-formaldehyde resin. The zein solutions used in accordance with my invention are, preferably, substantially non-aqueous or anhydrous and, in general, are stable in so far as separation is concerned at temperatures of 70° F. and somewhat below and in many instances at temperatures of 40° F. and somewhat below. In instances where water is present in these zein solutions, the solutions are, for all practical purposes, substantially non-aqueous since they preferably contain 5% or less of added water and in most instances, less than 5%. The solutions used in accordance with the present invention are fully described and claimed in my copending application Serial No. 158,215, filed August 9, 1937 and may be made by any of the methods described and claimed in my copending applications Serial Nos. 158,209, 158,210, 158,211, 158,212, 158,213 and 158,214, filed August 9, 1937 and Serial No. 158,735, filed August 12, 1937.

The heat-hardening urea-formaldehyde resin used in accordance with my invention is of the type described above and is preferably used in solution. The solvent for the resin is present in the mixture of urea and formaldehyde during the reaction to form the resin. The solvent may be, for example, glycerine, methyl or ethyl alcohol, acetone, carbon tetrachloride and the like, although I prefer to use the monohydric alcohol, n-butanol. The urea-formaldehyde resin used in accordance with my invention may be, for example, the product "Uformite F-224" which is a 60% solution of the resin in n-butanol.

In carrying out my invention I mix, in any suitable mixing device, a solution of zein with a solution of the resin in any desired proportions (based on solids). For most purposes, satisfactory results have been obtained by mixing solutions of zein and resin having a solids content which varied from equal parts of zein and resin to a major proportion of one in respect of the other. Thus, in a solution containing both zein and the resin, desirable results have been obtained when about 55 to 80% and even higher of the solids content was the resin and when about 52 to 70% and even higher of the solids content was zein. It has been found that the most satisfactory results are obtained when the solids content of the mixed solutions comprises equal parts by weight of zein and resin or a major proportion of resin in respect of the zein. Since the available zein solutions may have a solids content in the order of about 5 to about 33⅓% and the available resin solutions a solids content in the order of about 5 to about 60%, the solutions to be mixed must, of course, be controlled in respect of quantities and/or concentration in order to bring the solids contents thereof within the desired limits. Of the solvents or diluents for the resin solution mention may be made of ethanol, butanol, high molecular weight alcohols, ethylene glycol monoethyl ether and the like. The zein and resin solutions in the desired proportions are, in general, mixed at room temperature and care should be exercised in avoiding the use of incompatible solvents.

The heat-hardening coating composition produced in accordance with my invention may be used as a baking or thermo-setting coating, enamel or varnish. When applied to the surface or object to be coated and baked from about one to three hours at a temperature in the order of about 200° to 250° F., the coating or film is usually light colored, tough and strong and unusually flexible. The baked film is extremely hard and is resistant to marring and scratching. It imparts decided water and oil resistance and excellent dielectric properties to paper, cloth and the like. The composition is suitable for use as a coating wherever baking coatings are desired, and has particular application as a label coating and as an oil and water resistant coating for paper, paper composition or fabric containers or sheets. The film, when baked, is very tenacious and adherent and therefore is especially adapted for use as a bonding medium for paper, cloth, glass, wood, metal, metal foil and the like to form laminated structures. The coating may be applied to the surface or object to be coated as by coating machine, dipping, spraying or brushing process or by any other suitable coating process. The coatings air-dry at room temperature in the order of about 2 to 10 minutes and in some instances higher to a fairly hard, tough film and this characteristic of the coatings permits them to be baked within a relatively short period of time after the application of the coating. The drying time is, in general, accelerated by the application of heat.

The following detailed descriptions are offered as illustrative examples of heat-hardening coating compositions embodying my invention; however, my invention is not to be construed as limited thereto since the details thereof form no part of the invention included within the scope of my claims. In the examples, the term "parts" indicates parts by weight.

Example I 6 parts of zein are mixed with 14 parts of ethylene glycol monoethyl ether and the mixture heated for about 5 minutes at about 120° F. to form a zein solution. 15 parts of a 60% solution of partially reacted urea-formaldehyde resin in n-butanol are diluted with 15 parts of 95% ethyl alcohol at room temperature. The two solutions are mixed at room temperature and form a heat-hardening baking composition.

Example II 6 parts of zein are mixed with 14 parts of ethylene glycol monoethyl ether for about 5 minutes at about 120° F. to form a zein solution. 20 parts of a 60% solution of partially reacted urea-formaldehyde resin in n-butanol are diluted with 20 parts of 95% ethyl alcohol at room temperature. The solutions are mixed at room temperature to form the heat-hardening composition.

The composition comprises a solution of the mixed solids in the solvents. If cooled, for example, for about 24 hours at a temperature in the order of about 45° F. some separation of the solids takes place in this composition. However, on warming to a temperature in the order of about 65 to 70° F. the separated solids return to normal solution form.

Example III 6 parts of zein are mixed with 14 parts of 95% alcohol and heated at a temperature in the order of about 110° F. to form a zein solution. 10 parts of a 60% solution of partially reacted urea-formaldehyde resin in n-butanol are diluted with 2 parts of 95% alcohol. The solutions are mixed to form the heat-hardening composition.

The solution mixture is cloudy at room temperature even on the addition of 14 parts of 95% ethyl alcohol. The solution becomes somewhat less cloudy on the addition of 4 parts of ethyl lactate and on heating to about 110° F. to 120° F. the solution mixture becomes clear. On being cooled for 24 hours at a temperature in the order of 45° F. the solution becomes cloudy but no separation or gelling takes place. On reheating to 55 to 70° F. the solution mixture again becomes clear.

Example IV 6 parts of zein are mixed with 14 parts of 95% ethyl alcohol and heated at a temperature in the order of about 110° F. for about 5 minutes to form a zein solution. 10 parts of a 60% solution of partially reacted urea-formaldehyde resin in n-butanol are diluted with 10 parts of 95% ethyl alcohol. The solutions are mixed at a temperature in the order of about 100 to 110° F. to form a clear solution of the heat-hardening coating composition.

If this composition is cooled, for example, for about 24 hours at a temperature in the order of about 45° F., some solid gel-like material separates. This gel-like material is readily brought back into solution on being reheated to a temperature in the order of about 65 to 70° F.

In general, the heat-hardening liquid coating compositions prepared in accordance with my invention are stable on standing and at temperatures of 70° F. and below and do not separate even when cooled to temperatures of 60 to 70° F. and somewhat lower. These heat-hardening coating compositions, when cooled to temperatures below the limits set forth, may separate or become solid; however, on reheating again to temperatures of from about 65 to 70° F. a re-solution is effected either without or with slight stirring, and these solutions returned to their normal form without impairment at the re-heating temperatures. In general, the heat-hardening coating compositions prepared in accordance with my invention are characterized by the fact that they do not separate at the temperatures stated, have practically no tendency to gel at these temperatures and also in that they contain no added water or only a very slight percentage of water and are, therefore, substantially non-aqueous. Preferably, my heat-hardening coating compositions contain from 0 to 5% of added water and slight increases in the water content are not precluded.

The characteristics of the heat-hardening coating compositions embodying my invention and hence of the ultimate baked protective films can be altered at will and as desired by inclusion in the heat-hardening coating composition of diluents, modifiers, plasticizers and the like as set forth in my above-identified copending applications. The characteristics, such as spread and flow of the heat-hardening coating compositions may also be modified by the addition of a fatty acid such as, for example, oleic, linseed, hemp seed, lauric and like fatty acids, by the inclusion of blown or bodied drying oils such as blown China-wood oil or other oxidized oils, and by the inclusion of cetyl, lauryl, myristyl and like fatty alcohols having 8 or more carbon atoms in the chain. If desired, compatible natural and synthetic resins such as, for example, rosin, sandarac, copal, phenol-aldehyde, urea-aldehyde, glycerin-phthalic anhydrid, vinyl and like resins, or compatible cellulose derivatives such as, for example, high and low viscosity nitrocellulose, cellulose acetate, ethyl cellulose and like cellulose derivatives may be incorporated with the heat-hardening liquid coating compositions in varying proportions to meet the desired needs.

Suitable fillers such as, for example, cork, mica, saw dust, chalk, magnesite, clay, bentonite or equivalent colloidal clays, charcoal dust and the like; or suitable colors, pigments or dyes such as, for example, titanium oxide, satin-white, zinc oxide, methyl violet, anilin dyes and the like may, if desired, be added to the heat-hardening liquid coating compositions prepared in accordance with my invention.

While in the above description of my invention I have disclosed the formation of substantially non-aqueous heat-hardening liquid coating compositions by mixing a solution of zein with a solution of a partially reacted urea-aldehyde resin capable of being converted by heat, my invention is not to be construed as limited to this method since satisfactory heat-hardening liquid coating compositions may be obtained by reacting zein, urea, and formaldehyde to the intermediate stage to form a zein-modified heat converting urea-formaldehyde resin and dissolving the partially reacted modified resin in a suitable solvent or solvents.

I claim:

1. A heat-hardening, liquid coating composition comprising a solution of a prolamin and a water-insoluble carbamid-aldehyde resin dispersed uniformly therein, said solution comprising a prolamin and a substantially neutral, hydroxy organic solvent for the prolamin containing not in excess of 5% of water, said composition being characterized by being stable against separation of the prolamin at temperatures of 70° F. and being relatively non-gelling.

2. A heat-hardening, liquid coating composition comprising a solution of zein and a water-insoluble urea-formaldehyde resin dispersed uniformly therein, said solution comprising zein and a substantially neutral, hydroxy organic solvent for the zein containing not in excess of 5% of water, said composition being characterized by being stable against separation of the zein at temperatures of 70° F. and being relatively non-gelling.

3. A heat-hardening, liquid coating composition comprising a solution of zein and a water-insoluble, partially reacted urea-formaldehyde resin dispersed uniformly therein, said solution comprising zein and a substantially neutral hydroxy organic solvent for the zein containing not in excess of 5% of water, said composition being characterized by being stable against separation of the zein at temperatures of 70° F. and being relatively non-gelling.

4. A heat-hardening, coating composition comprising a solution of zein in admixture with a compatible, water-insoluble solution of a partially reacted urea-formaldehyde resin, said solution of zein comprising zein and a substantially neutral, hydroxy organic solvent for the zein containing not in excess of 5% of water, said composition being homogeneous and being characterized by being stable against separation of the zein at temperatures of 70° F. and being relatively non-gelling.

5. A heat-hardening, liquid coating composition comprising a solution of zein in admixture with a solution of a partially reacted urea-formaldehyde resin in butanol, said solutions being compatible, said solution of zein comprising zein and a substantially neutral, hydroxy organic solvent for the zein containing not in excess of 5% of water, said composition being characterized by being stable against separation of the zein at temperatures of 70° F. and being relatively non-gelling.

6. The method of forming a liquid zein coating composition capable of being converted by heat into an insoluble form and which is characterized by being stable against separation of the zein at temperatures of 70° F. and being relatively non-gelling, comprising dissolving zein in a substantially neutral, hydroxy organic solvent containing not in excess of 5% of water to form a zein solution and admixing the zein solution with a solution of a partially reacted urea-formaldehyde resin.

7. The method of forming a liquid zein coating composition capable of being converted by heat into an insoluble form which is characterized by being stable against separation of the zein at temperatures of 70° F. and being relatively non-gelling, comprising dissolving zein in a substantially neutral hydroxy organic solvent for the zein containing not in excess of 5% of water to form a zein solution and mixing the zein solution with a solution of a partially reacted urea-formaldehyde resin in n-butanol.

8. A heat-hardening, liquid coating composition comprising a solution of zein in alcohol containing not in excess of 5% of water and a water-insoluble urea-formaldehyde resin dispersed uniformly therein, said composition being characterized by being stable against separation of the zein at temperatures of 70° F. and being relatively non-gelling.

9. A heat-hardening, liquid coating composition comprising a solution of zein in ethylene glycol monoethyl ether containing not in excess of 5% of water and a water-insoluble urea-formaldehyde resin dispersed uniformly therein, said composition being characterized by being stable against separation of the zein at temperatures of 70° F. and being relatively non-gelling.

10. A heat-hardening, liquid coating composition comprising a solution of zein and a water insoluble urea-formaldehyde resin dispersed uniformly therein, said solution comprising zein, a substantially neutral, hydroxy organic solvent for the zein containing not in excess of 5% of water and a water-insoluble fatty acid, said composition being characterized by being stable against separation of the zein at temperatures of 70° F. and being relatively non-gelling.

11. A heat-hardening, liquid coating composition comprising a solution of zein having dispersed uniformly therein a water-insoluble urea-formaldehyde resin and a compatible glycerine-phthalic-anhydride resin, said solution comprising zein and a substantially neutral hydroxy organic solvent for the zein containing not in excess of 5% of water, said composition being characterized by being stable against separation of the zein at temperatures of 70° F. and relatively non-gelling.

ROY E. COLEMAN.